Oct. 11, 1927.
G. R. RICH
VALVE TAPPET AND ANALOGOUS ARTICLES
Filed Jan. 30, 1925
1,644,793
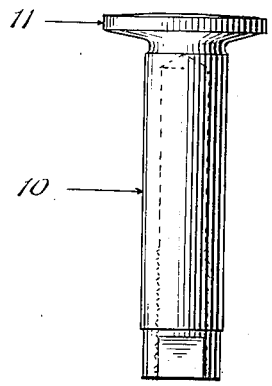
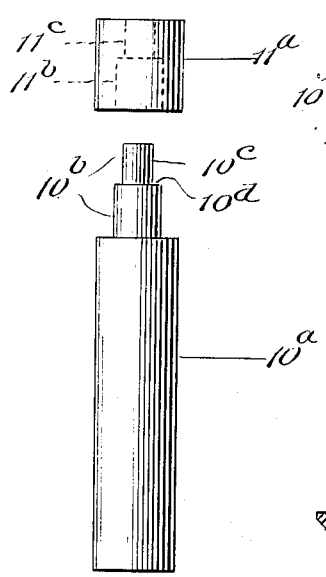
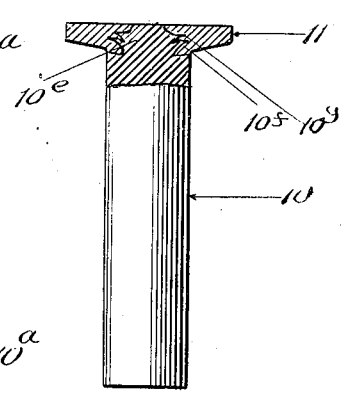
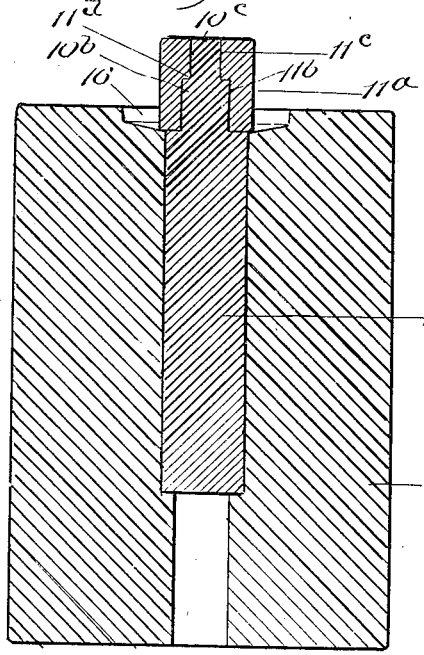
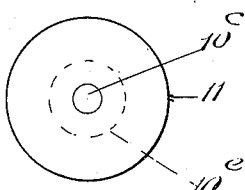
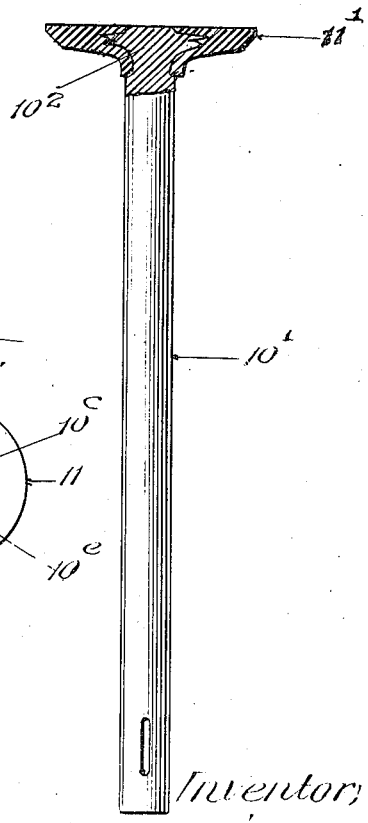
Inventor,
George R. Rich,
by Charles O. Shurvey
his Atty.

Patented Oct. 11, 1927.

1,644,793

UNITED STATES PATENT OFFICE.

GEORGE R. RICH, OF BATTLE CREEK, MICHIGAN.

VALVE TAPPET AND ANALOGOUS ARTICLES.

Application filed January 30, 1925. Serial No. 5,805.

This invention relates to valve tappets and analogous headed articles, such for instance, as poppet valves for internal combustion engines and has reference more particularly to headed articles made from two pieces of metal that are made integral with each other in the process of manufacture. The principal object of this invention is to unite the head and stem of valve tappets, poppet valves and analogous headed articles, in a novel and highly efficient manner whereby the possibility of separation between the head and stem is wholly eliminated. Another object is to provide novel means for uniting the head with the stem of such articles, whereby the head portion may be composed of one grade of material and the stem portion composed of another grade. In articles of this class the head portion is subject to the influence of high temperatures that tend to destroy the hardness of the head, whereas the stem portion is only subject to the ordinary friction wear caused by its reciprocating movements in its bearing. In accordance with the present invention the head portion may be composed of a grade of metal capable of effectively resisting intense heat, either caused by friction or by hot oxidizing gases, and the stem may be composed of a grade of material best suited for resisting wear caused by reciprocation in a lubricated bearing. For articles of higher grades, chrome steel or chrome silicon steel, chrome nickel steel and other high grade alloys may be used in the head portion and ordinary steel may be used for the stem. For certain classes of work the head portion may be made of iron alloys, for instance, silicon-iron, which is a metal alloy composed of iron and silicon and relatively low in carbon and being free from other elements in amounts sufficient to effect the alloy directly or positively. Silicon-iron contains approximately from one per cent to six per cent silicon and under approximately .12 per cent carbon, although these proportions may vary somewhat. The use of silicon-iron for the head portion is particularly advantageous in poppet valves because of the capability of this material to resist the hot oxidizing gases and the constant pounding of the valve head upon its seat.

With these and other objects and advantages in view this invention consists in a valve tappet, poppet valve or analogous headed article of manufacture made from two pieces of forgeable material, one piece forming the stem and an interior part of the head and the other piece forming the exterior portion of the head and being welded to the part contained therein. It further consists in a headed article of manufacture of which the exterior head portion is formed of silicon-iron welded to an interior portion which forms part of the stem. It further consists in a headed article of manufacture in which the portion of the stem contained within the head portion is spread out radially into the exterior head portion and welded thereto. It further consists in the hereinafter described process for uniting a head portion with a stem portion of a headed article of manufacture, wherein the portion of the stem which is contained in the exterior head portion is spread out radially into the flattened exterior head portion and welded thereto. It further consists in the several novel features hereinafter fully set forth and claimed.

The invention is clearly illustrated in the accompanying drawing in which:—

Fig. 1 is a side elevation of a valve tappet embodying a simple form of the present invention; Fig. 2 is a side elevation of the unfinished head portion and stem portion from which the valve tappet is produced; Fig. 3 is a view, partly in side elevation and partly in central longitudinal section of the valve tappet after the head and stem portion have been formed up and welded together; Fig. 4 is a central longitudinal section of the unfinished head portion and stem portion of the assembled valve tappet parts, and showing the same in a die in which the head portion is formed up and welded to the stem portion; Fig. 5 is an end view of the tappet seen in Fig. 1 and Fig. 6 is a view, partly in side elevation and partly in central longitudinal section, showing the application of the present invention to a poppet valve.

Referring to said drawing and first to Figs. 1 to 5 inclusive, the reference character 10 designates the stem of a valve tappet, embodying a simple form of the present invention, and 11 designates the head thereof. The head is usually of the flattened or disc like form now in common use in many of the tappets used in most of the automobile engines. The stem portion may be formed from a steel rod 10ᵃ (see Fig. 2) of suitable dimensions and the head is formed from a block 11ª of suitable dimensions to form the finished head. The stem portion may be made of one grade of steel suitable for resisting wear in a tappet bearing and the block may be formed of another grade of steel suitable for resisting high temperatures and the wear caused by the rubbing of a cam across its bearing face. The stem and block are welded together in a novel manner which will now be described.

In constructing a valve tappet in accordance with the present invention, I first cut a length of rod 10ª from a round steel rod of the proper diameter. The length of the piece 10ª is determined by the length of the finished tappet stem, plus the length of the metal block 11ª. This piece is preferably turned down at one end to form a reduced portion 10ᵇ which is of the same length as the block 11ª and in accordance with preferred practice the reduced portion 10ᵇ is further reduced in diameter as at 10ᶜ thereby leaving a shouldered portion 10ᵈ. The block 11ª is cut from a round metal rod of suitable diameter, preferably greater than the diameter of the stem portion of the piece 10ª, and its length is determined by the size of the tappet head which is to be forged therefrom. The block 11ª is bored to form a hole 11ᵇ which has a reduced portion 11ᶜ that leaves a shouldered portion 11ᵈ, the size and shape of the hole being the same as that of the reduced parts 10ᵇ, 10ᶜ, of the stem portion whereby said reduced parts of the stem portion may fit fairly well in the hole of the block. The side of the block may be machined down to the exact size required to form a tappet head. In assembling and welding the parts together, the reduced end of the stem portion is driven into the hole of the block and held therein by friction or otherwise and said end is then heated to a suitable temperature which will permit forging, and this will depend upon the character of the metal or metal alloys of which the stem portion and block are composed. When properly heated the stem portion 10ª is inserted in the center hole of a forming die 15 (see Fig. 4) the upper face of which has a recess 16 conforming to the shape of the under side of the tappet head which is to be formed. A forging machine, as for instance a power hammer is used for forging or shaping the head, but as the hammer forms no part of this invention it will not be described in detail. After the heated stem portion and block have been placed in the die, the hammer is set in motion and strikes upon the heated parts that protrude from the die. The block and part of the stem portion which protrude from the recess in the die are thereupon hammered down into said recess and they take the shape defined by the bottom and side of the recess. The upper reduced part of the stem portion is flattened down and spread out radially with the block and forms a flange or web 10ᵉ. (See Fig. 3.) During the process of hammering the block down, the temperature is increased slightly due to the friction caused by the hammer, and the stem portion and external head portion become effectively welded together into an integral body. The extreme end of the stem portion is hammered down flush with the end face of the head portion. The bottom face of the recess gives the desired form to the lowered side of the head.

When the reduced portion of the stem is stepped down as shown the shouldered part takes the form of a thin fin 10ᶠ (see Fig. 3) and the reduced portion 10ᶜ takes the form of another fin 10ᵍ. These fins are relatively thin and come to a relatively sharp edge and weld effectively with the exterior head portion.

After the blank is made up as shown in Fig. 3 it is machined and hardened in the usual manner. If desired the stem may be bored out to form a hollow stem and it is internally threaded as usual for the reception of the adjusting stud.

For high grade valve tappets a very tough, hard steel may be used for the head which will resist the great wear that is occasioned by the rubbing of the cam on the bearing face of the head and also the heat that is developed from the friction. The stem may be made of ordinary steel inasmuch as it is not subject to the hard use that the head is.

In Fig. 6 the invention is shown as applied to a poppet valve for internal combustion engines. The reference letter 10¹ designates the stem and 11¹ designates the valve head. The head and stem are united in substantially the same manner as the head and stem of the valve tappet, whereby a portion of the stem is contracted longitudinally and expanded laterally of itself in the form of a web 10² which is contained in and welded to the exterior portion of the head. If the stem is formed with reduced stepped portions like the stem of the valve tappet above described, the laterally expanded part of the stem will be formed with thin sharp fins circumferentially disposed about the laterally expanded part 10², whereby the stem and head will be more effectively welded together to form an integral piece.

The head of the valve may, of course, be made of one grade of material and the stem of another and I have found it to be of particular advantage to use silicon-iron in the manufacture of the head. Silicon-iron is a forgeable metal and is readily forged to the steel stem in accordance with the above described process. Furthermore, silicon-iron is a relatively inexpensive material, although it is exceeding efficient in resisting the high oxidizing temperatures and gases that develop in internal combustion engines.

In the specification and in the appended claims the term "forge" is employed. I desire it to be understood that this term wherever it occurs herein includes the process of fashioning or shaping up metal heated to a forging temperature, and welding the pieces together, whether by the process of hammering with repeated blows or by the application of pressure to the heated pieces.

More or less variation of the exact details of construction is possible without departing from the spirit of this invention; I desire, therefore, not to limit myself to the exact form of the construction shown and described, but intend, in the following claims, to point out all of the invention disclosed herein.

I claim as new, and desire to secure by Letters Patent:

1. A new article of manufacture, comprising a disc like head and stem, composed of two pieces of forgeable material, one piece comprising the major and exterior portion of the head and the other piece comprising the stem and having a part thereof within the head, the part of the stem within the head having a plurality of separate annular radially extending fins, each tapering to a thin edge, and the head piece having separate thin annular radially extending fins overlapping the fins of the stem portion and being integrally united with the piece which formed the stem.

2. As a new article of manufacture a valve tappet comprising a disc like head and a stem, composed of two pieces of forgeable material, the material of one piece being different than that of the other and one piece comprising the major and exterior portion of the head, and the other piece comprising the stem and having a part thereof within the head, the part of the stem within the head having separate annular radially extending fins each tapering to a thin edge and extending into the head piece, the head piece having separate annular radially extending fins overlapping the fins of the stem piece and integrally united therewith.

GEORGE R. RICH.